["United States Patent" [19]]

Reist

[11] 4,151,754
[45] May 1, 1979

[54] CHAIN DRIVE
[75] Inventor: Walter Reist, Hinwil, Switzerland
[73] Assignee: Ferag AG, Hinwil, Switzerland
[21] Appl. No.: 812,613
[22] Filed: Jul. 5, 1977
[30] Foreign Application Priority Data
Jul. 9, 1976 [AT] Austria .................................. 5076/76
[51] Int. Cl.2 ............................................. B61B 10/02
[52] U.S. Cl. ..................................... 74/89.2; 104/162
[58] Field of Search ...................... 104/172 S, 162, 50; 74/89.2, 222, 243 B; 198/736; 214/16.4 A
[56] References Cited
U.S. PATENT DOCUMENTS

| 387,907 | 8/1888 | Pendleton | 104/162 |
| 3,187,596 | 6/1965 | Doerr | 74/243 B X |
| 4,070,972 | 1/1978 | Folsom et al. | 104/172 S |

FOREIGN PATENT DOCUMENTS

| 294795 | 3/1926 | Fed. Rep. of Germany | 104/162 |
| 948694 | 8/1956 | Fed. Rep. of Germany | 104/162 |
| 133914 | 4/1960 | U.S.S.R. | 104/50 |

Primary Examiner—Roy D. Frazier
Assistant Examiner—Robert W. Gibson, Jr.
Attorney, Agent, or Firm—Werner W. Kleeman

[57] ABSTRACT

A chain drive arrangement wherein there is provided a link chain having a finite chain strand. At least at one side of a stationarily arranged chain-drive unit for the chain strand, which drive unit is reversible with respect to its drive direction, the chain strand is supported by means of its hinges or joints in a guide means.

2 Claims, 9 Drawing Figures

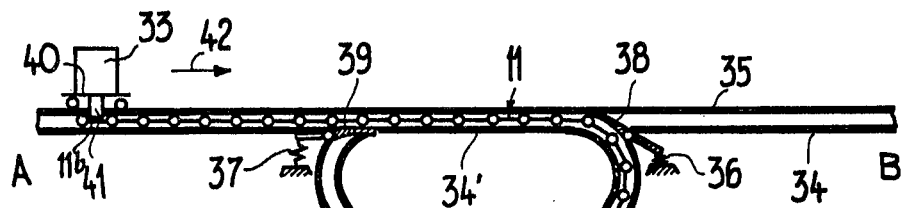
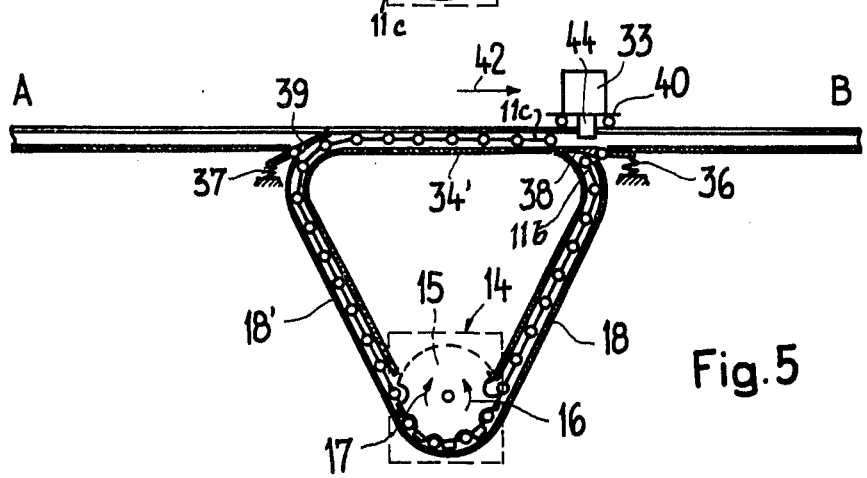
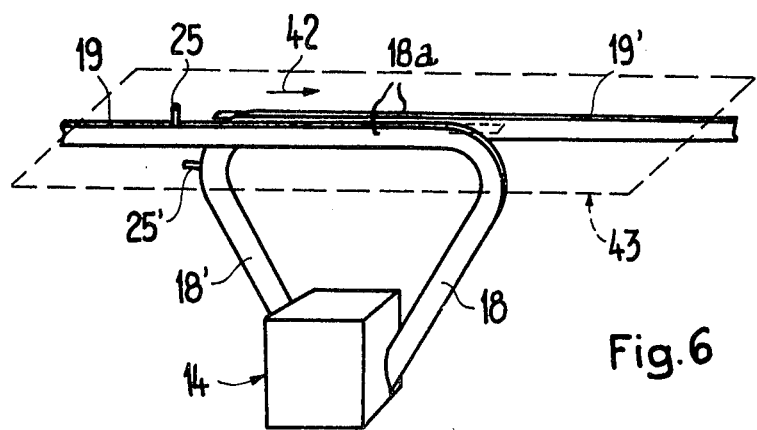

CHAIN DRIVE

BACKGROUND OF THE INVENTION

The present invention relates to a new and improved construction of chain drive.

Most of the heretofore known chain drives possess an endless, closed chain, even if such is guided in a rail. This automatically results in an arrangement wherein the chain possesses two runs, of which one can be designated as an "active" run and the other as a "return" run. Generally, the return run is not in use, notwithstanding the fact that it occupies a considerable amount of space.

Additionally, if in the case of a chain which is guided in a rail it is desired to alter the course of travel of such chain in order to accommodate such to different operating conditions, then with the prior art drives it is necessary to dismantle the chain, remove it from the rail, then to adjust or structure the rail in accordance with the new intended course of travel of the chain, to accommodate the chain in its length to such new course of travel, introduce such into the rail and then again reassemble the chain. All of these operations are associated with a considerable expenditure in time.

SUMMARY OF THE INVENTION

Hence, it is a primary object of the present invention to provide a new and improved construction of chain drive arrangement which is not associated with the aforementioned drawbacks and limitations of the prior art constructions.

Another and more specific object of the present invention aims at the provision of a novel chain drive which is economical in construction, highly reliable in operation, relatively easy and efficient to use, and not readily subject to malfunction and breakdown.

Now in order to implement these and still further objects of the invention, which will become more readily apparent as the description proceeds, the chain drive or chain drive arrangement of the present invention is manifested by the features that there is provided a finite chain strand of a link chain and that at least at the one side of a stationarily arranged chain-drive unit of the chain strand, which drive unit is reversible with respect to its drive direction, the chain strand is supported by means of its joints or hinges in a guide means.

Due to the fact that the finite strand of the link chain is guided at its hinges or joints, there is obtained the beneficial result that the link chain, in contrast to conventional chain drives, also can be loaded compressively without kinking or bowing out, i.e. the chain also can be pushed.

The chain strand, which advantageously consists of a portion of a ball-and-socket joint-chain, is beneficially arranged in a hollow rail enclosing its joints. The hollow rail, in turn, is advantageously lengthwise slotted, and the chain strand can be provided at least at its end located in the hollow rail with an entrainment member or a load device or equipment. The course of the rail for this chain drive can be changed-over quite easily by means of branches or switches.

At the other side of the drive unit there can be provided a magazine or storage for the non-used portion of the chain strand. The magazine, in turn, can likewise be constructed in the form of a hollow rail which receives the chain strand, and this hollow rail, for space-saving reasons, can extend in a helical-or spiral-shaped configuration. On the other hand, the magazine also can be structured such that it loosely receives the portion of the strand.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 4 and 5 show a further embodiment of chain drive where at both sides of the drive unit there is subsequently arranged a guide or guide means;

FIG. 6 illustrates a modified embodiment of the chain drive arrangement or chain drive of FIGS. 4 and 5.

DETAILED DESCRIPTION OF THE PREFERRED EMBODIMENTS

Figure 1:
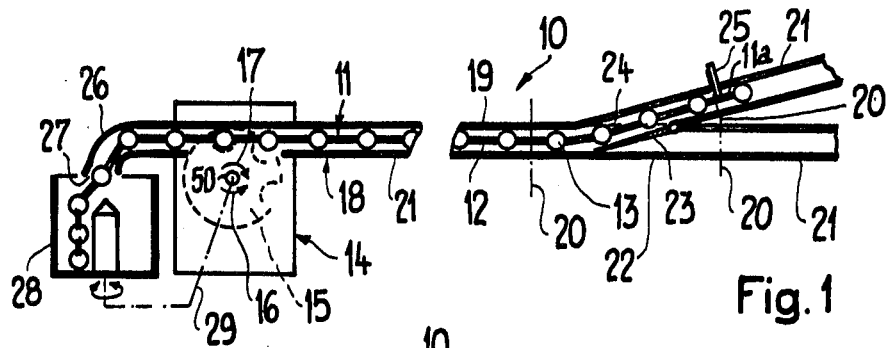
FIG. 1 is a schematic illustration of a first exemplary embodiment of a chain drive arrangement or chain drive constructed according to the teachings of the present invention.

Describing now the drawings, the chain drive or chain drive arrangement 10 illustrated by way of example in FIG. 1, will be seen to comprise a finite strand of a ball-and-socket joint-chain 11, the chain links 12 of which have been shown for convenience in illustration in the form of rods and the ball-and-socket joints 13 which interconnect such chain links 12 have been simply illustrated in the form of circles. The ball-and-socket joint-chain 11 has operatively associated therewith a drive unit or drive means 14 containing a drive element which engages in a form-locking or positive manner at the chain 11, this drive element here being shown as a sprocket wheel 15 provided at its periphery with an outer profile configured in mirror-image fashion or complementary to the chain profile. This sprocket wheel or gear 15 is driven by any suitable and therefore simply schematically indicated drive 50 both in the direction of the arrow 16 as well as also in the direction of the arrow 17. In other words: in the showing of FIG. 1 it is thus possible to displace the ball-and-socket joint-chain 11 from the right towards the left as well as also from the left towards the right. It should be understood that instead of the sprocket wheel 15 there can also be used a different drive element, for instance a worm, the axis of which extends parallel to the plane of the drawing.

At the one side —considered in terms of the inlet or outlet, respectively— of the drive unit 14 there merges therewith a substantially tubular-shaped lengthwise slotted hollow rail 18. The lengthwise longitudinal slot 19 of the hollow rail 18 has been here shown as a matter of convenience in illustration as located in the plane of the drawing, although it is to be imagined that in reality this longitudinal slot advantageously extends approximately in the apex of the cross-section of the hollow rail 18 which faces towards or away from the observer. The hollow rail 18 is structured in building block manner or as modules of a number of sections which can be joined to one another, and the abutting surfaces of neighboring sections have been indicated by broken lines 20. In FIG. 1 there will be recognized three linear sections 21 as well as a branch or switch section 22. Of course, there may also be used curved rail sections, so that the hollow rail 18, viewed in its entirety, can be compared with the tracks of a model train, which, in turn, is assembled from different track sections. By switching the branch or switch tongue 23 at the branch or switch section 22 from the position illustrated in full lines in FIG. 1, by displacing the same in clockwise direction, into the position indicated with broken lines 24, and with the ball-and-socket joint-chain 11 withdrawn out of the switch or branch section 22, it is possible to change-over the course or path of travel of the ball-and-socket joint-chain 11 from the path of travel defined by the linear section 21 appearing at the upper right of FIG. 1 into the path of travel which is defined by the linear section appearing at the lower right of the showing of FIG. 1.

At the end 11a of the ball-and-socket joint-chain 11 which is located in the hollow rail 18 there is attached a schematically depicted entrainment member or entrainment means 25 which extends through the longitudinal slot 19 and serves the purpose of engaging with an object or otherwise which is to be moved by the chain drive or chain drive arrangement 10. This entrainment member 25 may be a simple impact or stop member, but also can be for instance a gripper or a hook, as such as conventionally known from standard drag chain conveyors or overhead conveyors.

From what has been explained above it will be apparent that by means of the part of the finite ball-and-socket joint-chain 11 which appears at the right of the drive means or unit 14 it is possible to transmit by means of the entrainment member 25 movements, which in the showing of FIG. 1, are accomplished from the left towards the right as well as also from the right towards the left, and the ball-and-socket joint-chain 11 in the first instance can be loaded compressively or under pressure and in the second instance under traction.

At the side of the drive unit 14 which is located opposite the hollow rail 18 there merges therewith a curved rail section 26, the open end 27 of which terminates into an open magazine or storage container 28, which, as illustrated, serves to receive the section of the ball-and-socket joint-chain 11 which is so-to-speak not "in use", and specifically, for instance, in a loose, random formation which is produced upon deposition of such chain section into the container or receptacle 28. On the other hand, the receptacle 28 can also be rotatable and, as generally indicated by the phantom or broken line 29, operatively coupled by standard coupling means with the drive 50 of the sprocket wheel 15, so that the free portion or section of the ball-and-socket joint-chain 11 tends to pile up in a more or less helical-shaped configuration in the receptacle 28.

With the illustrated embodiment of chain drive there is thus clearly not present any return run. Furthermore, it is possible to alter the path of travel or course of the path of movement of the ball-and-socket joint-chain 11 in an extremely simple manner as will be readily evident. It is sufficient to retract the chain practically into the drive unit or means 14, whereafter by joining together a different combination of suitable hollow rail-sections 21, 22 there can be designed a new path of travel for the chain structure and into which there can be simply inserted the finite ball-and-socket joint-chain 11.

Figure 2:
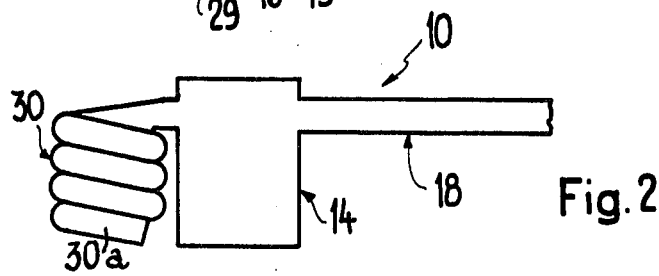
FIG. 2 schematically illustrates a modified embodiment of chain drive.

In FIG. 2 there is illustrated a variant construction of the chain drive arrangement, wherein the difference from the embodiment of FIG. 1 resides in the fact that the magazine here comprises a hollow rail 30 which is wound into a number of coils 30a. Further, it should be understood that these coils 30a may be of spiral-shaped configuration, or, as shown, of helical-shaped configuration, and it is immaterial during use of the ball-and-socket joint-chain in which direction the axis of the spiral or helix, as the case may be, extends. One of numerous conceivable fields of application for which the described chain drive 10 is suitable, will be explained more fully based upon the showing of FIGS. 3A, 3B and 3C. There will be recognized by referring to such FIGS. 3A to 3C two straight sections or portions 21 of the hollow rail between which there is incorporated a branch or switch section or portion 22. The portions or sections 21 and 22 are suspended by means of suitable supports 31 at the ceiling 32 of a room or the like. Hence, the longitudinal slot 19 in the hollow rail extends downwardly. The one outlet of the switch or branch section 22 likewise extends downwardly and is open i.e. is without any projection or extension. At the last hinge or joint of the ball-and-socket joint-chain 11 there is articulated a lifting device or lifting equipment 32, for instance in the form of a load hook, which lifting device carries a load 33. The length of the lifting device or equipment 32 is of course sufficient, so that in the event the switch tonque or blade 23 which in this case is split or bifurcated, is switched-over, then the downwardly extending outlet of the switch section 22 does not hinder the throughpassage of the travelling load 33.

Figures 3A, 3B, 3C:
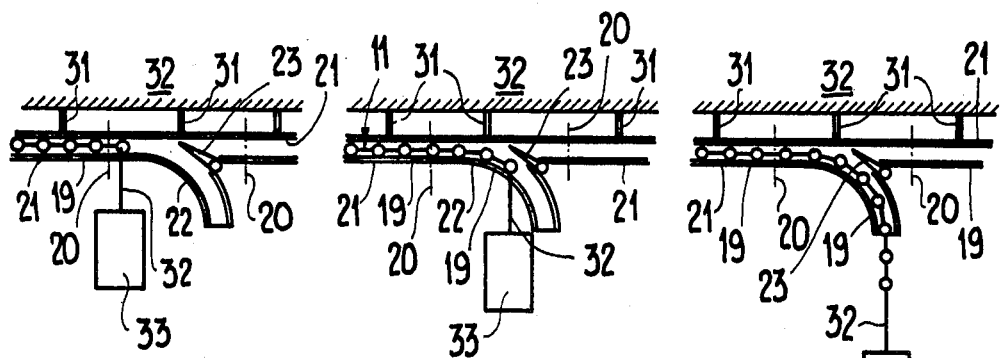
FIGS. 3A, 3B and 3C illustrate an exemplary application of the chain drive arrangement wherein the same is employed as a lifting device, and the chain itself serves as a lift cable and to a certain extent also as a crane or travelling winch.

If FIGS. 3A, 3B and 3C are viewed in the just-mentioned sequence, then it will be observed that the ball-and-socket joint-chain of FIG. 3A coacts with the lifting equipment 32 to a certain extent in the form of a crane and is loaded compressively, whereas in FIG. 3C the chain is loaded in tension or traction and works to a certain extent as a lifting chain having "remote-controlled drive". Viewed in the reverse sequence, namely the sequence of FIGS. 3C, 3B and 3A, then the ball-and-socket joint-chain is always under tensional load.

With the embodiment of FIGS. 4 and 5 there is arranged following the drive unit 14, at both sides thereof, a guide or guide means in the form of a hollow rail section or element 18 and a further hollow rail section or element 18'. Both the hollow rail section or element 18 as well as also the hollow rail section or element 18' merge tangentially and while directed or facing towards one another into a common, linear extending section or portion 34' of the hollow rail 34 having a longitudinal or lengthwise extending slot 35. The opening locations of the hollow rail sections or elements 18, 18' into the section 34' are equipped with a respective flap member 38 and 39, each pre-biased into their closed position by means of a respective weak spring 36 and 37, as shown. In this case, the length of the ball-and-socket joint-chain or strand 11 is chosen such that it amounts to almost but not quite the sum of the length of the hollow rail section 18, the portion wrapped about the drive element 15, the hollow rail section 18' and the section or portion 34' of the hollow rail 34 which is located between the flaps or flap members 38 and 39.

With this exemplary embodiment the chain strand is not equipped with entrainment members. This chain drive is predominantly conceived for the purpose of transporting loads 33, which are deposited upon a carriage 40, for instance from point A to point B or vice versa. For this purpose the carriage 40 is equipped with an entrainment member 41 which engages in the slot 35 and in the chain strand or chain 11. Now if the drive element 15 of FIG. 4 is rotated in the clockwise direction, as indicated by the arrow 17, and the entrainment member 41 engages at the trailing end 11b of the chain strand 11, then the carriage 40 is dragged in the direction of the arrow 42, and its path of travel is determined by the longitudinal slot 35 which thus also constitutes the guide rail for the carriage. If the trailing end 11b of the chain strand 11 has passed the flap or flap member 39, then such is raised by the leading end 11c of the chain strand, and such leading end then follows at a short distance the trailing end 11b within the section or portion 34', until such trailing end 11b moves past the flap member 38 and enters the hollow rail 18 and thus comes out of engagement with the entrainment member 41. This phase of operation has been illustrated in FIG. 5. Shortly thereafter, however, the leading end 11c of the chain strand 11 engages with the entrainment member 41 again and transports the carriage 40 towards location or point B. The chain drive illustrated in FIGS. 4 and 5 possesses the advantage that its course or path of travel which is determined particularly by the hollow rail 34 is extensively independent from the site of the drive unit which acts upon the chain, so that during the course of conveying of the load 33 such is transferred from the trailing end to the leading end of the chain strand or chain 11. It is immaterial whether the movement is accomplished from location A towards location B or in the reverse sense. Only the direction of rotation of the drive element 15 changes, for instance as indicated by the arrow 16.

If it is intended to avoid the short interruption of the movement transmission to the load during the transfer from the trailing end to the leading end of the chain strand, then it is possible to employ a constructional embodiment of the type shown in FIG. 6.

With this variant embodiment the hollow rails 18 and 18' which extend from the drive unit or drive means 14 are of substantially V-shaped configuration and their legs 18a which are spaced or remote from the drive unit 14 are disposed in parallelism and in direct neighboring relationship to one another, for instance located below a conveyor table 43. In this case both the one as well as the other end of the chain strand, which is not visible in the showing of FIG. 6, is equipped with a respective entrainment member 25 and 25' which extend outwardly through the longitudinal slots 19 and 19' in the hollow rails 18 and 18' respectively. The spacing between the entrainment members or entrainment means 25 and 25' is selected such that both the entrainment members 25 and 25' move at approximately the same height at which the legs 18a of the hollow rails 18, 18' remote from the drive unit 14 extend in parallelism to one another. In this way there is achieved the result that there is accomplished a continuous transmission of the movement even during the transfer of the load from the entrainment member 25 to the entrainment member 25'. Also in this case the path of travel of the active portion of the chain strand is defined by the legs 18a of the hollow rails 18, 18' remote from the drive unit 14 and therefore is practically independent of the site of the drive unit 14.

Figure 7:
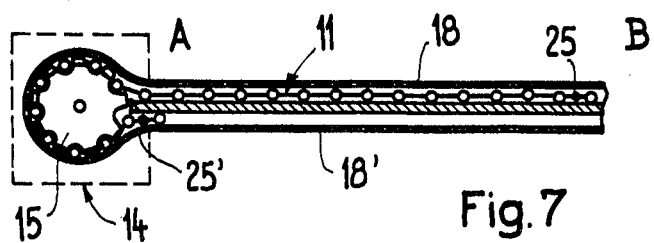
FIG. 7 is a fragmentary sectional view of a further embodiment of the invention.

A further exemplary embodiment of the invention is finally schematically disclosed in FIG. 7.

With this variant construction there again merge to both sides (considered with respect to the inlet or outlet respectively) of the drive unit 14 a respective hollow rail 18 and 18'. These hollow rails 18 and 18', however, extend in the same direction directly next to one another in a route or shape corresponding to the special field of application, which, in FIG. 7 has been shown purely by way of example as being straight. Both ends of the chain strand or chain 11 are equipped with an entrainment member or entrainment means 25 and 25', respectively, which in this case extend out of a not particularly illustrated longitudinal slot provided at the side of the related hollow rail 18 and 18', respectively, which is closer to the observer of the drawing. If the entrainment member 25 has reached one end of its stroke, then the entrainment member 25' automatically is at the other end of its stroke. In other words: if one entrainment member begins its return stroke, then the other entrainment member simultaneously and automatically begins its work stroke. The chain drive illustrated in FIG. 7 is particularly advantageous for instance in its use as an overhead conveyor, which is assigned the function of periodically transporting piece goods from the location or point A to the location or point B or vice versa. The return stroke of the one part of the chain strand 11 is always compensated by a simultaneous work stroke of the other part of the chain strand i.e. with the same conveying speed the number of strokes is doubled.

In the event that the paths of travel of the chain, which are intended for a certain field of application, are essentially flat, i.e. two-dimensional, then of course there can be employed instead of the illustrated ball-and-socket joint-chain also a pivotal chain having pin joints, wherein the hinge or joint pins are disposed at right angles to the plane defined by the paths of travel or movement. In the event that it is necessary to transmit particularly large forces by the chain strand, then it is also possible to provide a chain, the joints or hinges of which are guided by rollers in the rails.

It should be understood that the entire length of the chain strand is to be chosen as a function of the longest path of travel which comes into consideration for the guided part of the strand.

On the other hand, it is of course possible to accommodate this chain length quite simply to any new encountered field of application by adding or dismantling, as the case may be, additional elements to the one or other end of the chain strand, without having to exchange the entire chain drive.

The described chain drive possesses a so-to-speak unlimited flexibility with respect to its accommodation to different fields of application, is extremely simple in construction, and along therewith economical and allows considerable freedom to the person skilled in the art in the selection of the design, i.e. for instance in the selection of the place of erection or site of the drive unit 14 with respect to the region which is to be serviced by the entrainment members 25, 25' or the lifting equipment 32, as the case may be.

While there are shown and described present preferred embodiments of the invention, it is to be distinctly understood that the invention is not limited thereto, but may be otherwise variously embodied and practiced within the scope of the following claims.

I claim:
1. A chain drive arrangement, comprising:
a link chain embodying a finite chain strand;

stationarily arranged chain-drive means reversible with respect to the direction of driving of the link chain;

said link chain including joint means;

guide means for guiding the chain by means of its joint means at least at one side of the chain-drive means;

means defining a magazine for a part of the chain strand located at an other side of the drive means; and said magazine being a receptacle-like structure and constructed such that said part of the chain strand can be loosely received therein.

2. The chain drive arrangement as defined in claim 1, wherein:

said drive means includes a drive element; and said magazine being operatively coupled with said drive element for the conjoint rotation therewith.

* * * * *